(12) United States Patent
Isada et al.

(10) Patent No.: US 9,377,159 B2
(45) Date of Patent: Jun. 28, 2016

(54) SYSTEM AND METHOD FOR SEALING CATALYST WITHIN AFTERTREATMENT HOUSING

(71) Applicant: Caterpillar Inc., Peoria, GA (US)

(72) Inventors: Raymond U. Isada, Peoria, IL (US); Chiranjeevi Mangamuri, Peoria, IL (US); Mirza Pervaiz Baig, LaGrange, GA (US)

(73) Assignee: Caterpillar Inc., Peoria, IL (US)

( * ) Notice: Subject to any disclaimer, the term of this patent is extended or adjusted under 35 U.S.C. 154(b) by 307 days.

(21) Appl. No.: 14/103,009

(22) Filed: Dec. 11, 2013

(65) Prior Publication Data

US 2015/0157981 A1 Jun. 11, 2015

(51) Int. Cl.
| | |
|---|---|
| *B01D 50/00* | (2006.01) |
| *F16M 13/02* | (2006.01) |
| *F01N 3/10* | (2006.01) |
| *F01N 13/18* | (2010.01) |
| *F01N 13/00* | (2010.01) |

(52) U.S. Cl.
CPC ............. *F16M 13/02* (2013.01); *F01N 3/103* (2013.01); *F01N 13/0093* (2014.06); *F01N 13/0097* (2014.06); *F01N 13/1805* (2013.01); *F01N 13/1822* (2013.01); *F01N 13/1855* (2013.01); *Y10T 29/49826* (2015.01)

(58) Field of Classification Search
CPC ............ F01N 13/0093; F01N 13/1855; F01N 13/1805; F16M 13/02; Y10T 29/49826

USPC .................................................. 422/171, 177
See application file for complete search history.

(56) References Cited

U.S. PATENT DOCUMENTS

| | | | | |
|---|---|---|---|---|
| 5,169,604 | A * | 12/1992 | Crothers, Jr. .......... | F01N 3/2853 422/177 |
| 5,746,986 | A * | 5/1998 | Pollock .............. | B01D 53/8653 181/264 |
| 7,410,621 | B2 * | 8/2008 | Muter ................... | F01N 3/2839 422/168 |
| 7,919,052 | B2 | 4/2011 | Ahmed | |
| 8,062,602 | B2 * | 11/2011 | Roe ........................ | F01N 3/2839 422/179 |
| 8,066,950 | B2 * | 11/2011 | Newburry ............. | F01N 3/2839 422/180 |
| 8,468,825 | B1 * | 6/2013 | Cone ........................ | F01K 23/10 165/135 |
| 8,932,531 | B2 * | 1/2015 | Muter ................... | F01N 3/2875 422/177 |

\* cited by examiner

*Primary Examiner* — Tom P Duong

(57) ABSTRACT

A spreader bar assembly is provided. The spreader bar assembly includes a pair of arms disposed in a scissor type arrangement. The pair of arms defines an axis of rotation therebetween. The spreader bar assembly further includes a contact member attached to an end of each of the pair of arms. The contact member of the spreader assembly is configured to contact with a catalyst. The spreader assembly also includes a sealing member. The sealing member is provided in association with the contact member. The sealing member is disposed on a first side of each of the pair of arms such that on exerting a force on the sealing member on the first side of each of the pair of arms, an opposing force is generated on a second side of each of the pair of arms disposed substantially opposite the first side of each of the pair of arms.

9 Claims, 7 Drawing Sheets

SYSTEM AND METHOD FOR SEALING CATALYST WITHIN AFTERTREATMENT HOUSING

TECHNICAL FIELD

The present disclosure relates to a sealing assembly, and more particularly to a spreader bar assembly for sealing a catalyst within an aftertreatment housing.

BACKGROUND

A Diesel Oxidation Catalyst (DOC) housing of an exhaust aftertreatment system includes catalysts that may facilitate in reduction of Hydrocarbon (HC) and Carbon Monoxide (CO). These catalysts may need to be accessed from the DOC housing for servicing. Known fixture assemblies may be relatively difficult to install, thereby increasing down time associated with replacing the catalysts.

U.S. Pat. No. 7,919,052 discloses a catalytic converter within a housing. The housing defines a conduit and has a support wall defining an opening in the conduit. A removable catalyst element covers the opening for treating an exhaust gas passing through the conduit. A removable bar abuts the catalyst element. A first end of the bar is anchored to the wall and a second end of the bar is bolted to the wall thus clamping the catalyst element between the wall and the bar.

SUMMARY OF THE DISCLOSURE

In one aspect of the present disclosure, a spreader bar assembly for sealing a catalyst within an aftertreatment housing is provided. The spreader bar assembly includes a pair of arms disposed in a scissor type arrangement. The pair of arms defines an axis of rotation therebetween. The spreader bar assembly further includes a contact member attached to an end of each of the pair of arms. The contact member of the spreader assembly is configured to contact with the catalyst. The spreader assembly also includes a sealing member. The sealing member is provided in association with the contact member. The sealing member is disposed on a first side of each of the pair of arms such that on exerting a force on the sealing member on the first side of each of the pair of arms, an opposing force is generated on a second side of each of the pair of arms disposed substantially opposite the first side of each of the pair of arms.

In another aspect of the present disclosure, an aftertreatment housing is provided. The aftertreatment housing includes an inlet chamber and an outlet chamber. The aftertreatment housing also includes a pair of catalysts disposed between the inlet chamber and the outlet chamber. The aftertreatment housing further includes a spreader bar assembly disposed between the pair of catalysts. The spreader bar assembly includes a pair of arms disposed in a scissor type arrangement. The pair of arms defines an axis of rotation therebetween. The spreader bar assembly further includes a contact member attached to an end of each of the pair of arms. The contact member of the spreader assembly is configured to contact with the catalyst. The spreader assembly also includes a sealing member. The sealing member is provided in association with the contact member. The sealing member is disposed on a first side of each of the pair of arms such that on exerting a force on the sealing member on the first side of each of the pair of arms, an opposing force is generated on a second side of each of the pair of arms disposed substantially opposite the first side of each of the pair of arms.

In yet another aspect of the present disclosure, a method of supporting a pair of catalysts within an aftertreatment housing is disclosed. The method includes installing the pair of the catalysts within the aftertreatment housing. Each of the pair of catalysts within the aftertreatment housing is axially spaced apart from one another. The method also includes providing a pair of support structures at least partially surrounding each of the pair of catalysts respectively. The method further includes preventing radial movement of each of the pair of catalyst with respect to an axis of the aftertreatment housing by the pair of support structures. The method includes providing a spreader bar assembly between the pair of the catalysts. The method includes preventing an axial movement of each of the pair of catalysts with respect to the axis by the spreader bar assembly. The method further includes exerting a force on a first side of the spreader bar assembly. The method also includes generating an opposing force on a second side of the spreader bar assembly based on the exerted force, wherein the second side is disposed substantially opposite the first side of each of the pair of arms.

Other features and aspects of this disclosure will be apparent from the following description and the accompanying drawings.

DETAILED DESCRIPTION

Figure 1:
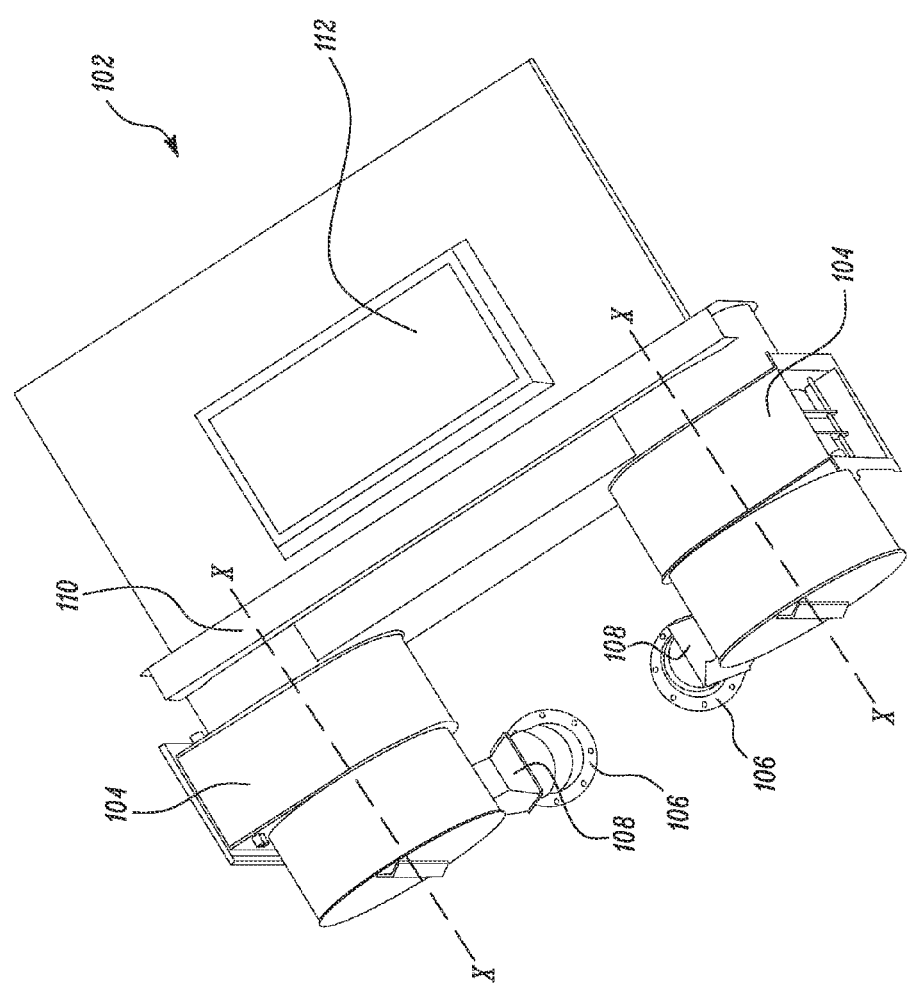
FIG. 1 is a perspective view of an aftertreatment housing including a Diesel Oxidation Catalyst (DOC) housing.

Wherever possible, the same reference numbers will be used throughout the drawings to refer to the same or the like parts. FIG. 1 is a perspective view of an aftertreatment housing 102 including a Diesel Oxidation Catalyst housing 104. The aftertreatment housing 102 may be connected to an exhaust system (not shown) of an exemplary power system (not shown). It is contemplated that the power system may embody a multi-cylinder internal combustion engine. The power system may also embody various types of power systems, if desired, such as one including a diesel, gasoline, or gaseous fuel-powered engine associated with a mobile machine such as a locomotive, or a stationary machine such as a pump.

The aftertreatment housing 102 may include a housing (not shown) having at least one inlet 106. The inlet 106 is configured to receive an exhaust gas flow from an exhaust manifold associated with the power system. In the accompanying figures, two inlets 106 are shown disposed spaced apart from one another. Parameters related to the inlet 106 such as shape, size, location and orientation and number of the inlets may vary based on the application. An inlet passage 108 is in fluid communication with the inlet 106. The inlet passage 108 has a hollow structure and is configured to direct the exhaust gas flow towards the Diesel Oxidation Catalyst (DOC) housing 104.

The DOC housing 104 is configured to receive the exhaust gas flow from the inlet passage 108. Further, the DOC housing 104 is configured to house a catalyst 302 (See FIG. 3) therein. In one exemplary embodiment, the catalyst 302 may be a DOC catalyst, although the present disclosure is not limited thereto. A chemical reaction taking place within the DOC housing 104 may alter a composition of the exhaust gas flowing through the DOC housing 104. This chemical reaction may facilitate reduction of Hydrocarbon (HC) and Carbon Monoxide (CO) and conversion of NO to $NO_2$ for further treatment by an additional catalyst (not shown). In one embodiment, the catalyst 302 within the DOC housing 104 may additionally perform particulate trapping functions, hydro-carbon reduction functions, carbon-monoxide reduction functions, and/or other functions known in the art for the treatment of the exhaust gas flow. The construction of the DOC housing 104 and the installation of the catalyst 302 therein will be explained in detail in connection with FIGS. 2 to 6.

In the illustrated embodiment, the aftertreatment housing 102 includes a pair of the DOC housings 104. The exhaust gas flowing through the DOC housings 104 is configured to flow into a collection chamber 110. The collection chamber 110 extends laterally across the aftertreatment housing 102 and is configured to collect the exhaust gas flowing thereinto from the DOC housings 104. The aftertreatment housing 102 may further include a Selective Catalytic Reduction (SCR) catalyst (not shown) present downstream of the collection chamber 110 with respect to the flow of the exhaust gas in the system.

The $NO_x$ (NO and $NO_2$) present in the exhaust gas flowing through the SCR catalyst may undergo a chemical reaction to form water ($H_2O$) and diatomic nitrogen ($N_2$). Further, the exhaust gas may flow towards an exhaust outlet 112 of the aftertreatment housing 102. The exhaust gas flow may thereby exit from the aftertreatment housing 102 through the exhaust outlet 112.

A person of ordinary skill in art will appreciate that the structure and construction of the aftertreatment housing 102 described herein is merely exemplary and does not limit the scope of present disclosure. The aftertreatment housing 102 may additionally include other components such as, for example, a mixing tube, a flow distributor, and so on. Also, the design of the aftertreateement housing 102 shown in the accompanying figures may vary based on the application and space constraints of the system.

Figure 2:
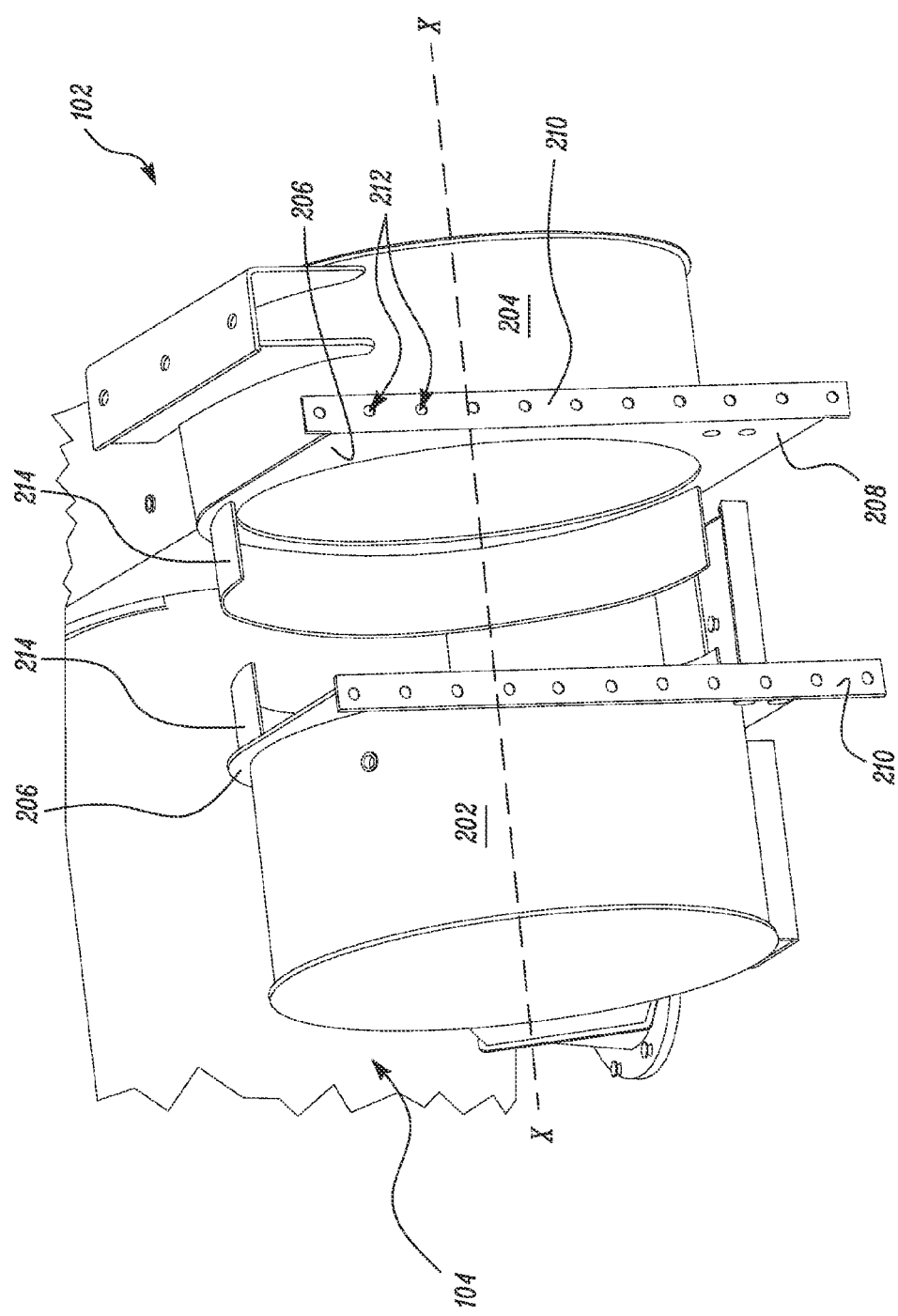
FIG. 2 is a cutaway perspective view of the DOC housing including a pair of clamping walls.

As described earlier, the DOC housing 104 includes the catalyst 302. The present disclosure relates to a retention mechanism for sealing the catalyst 302 within the DOC housing 104 and preventing a movement of the catalyst 302 within the DOC housing 104. FIGS. 2 to 5 illustrate cutaway perspective views of various steps for installing a pair of the catalysts 302 within one of the DOC housings 104 of the aftertreatment housing 102, according to various embodiments of the present disclosure. FIG. 2 is a perspective view of the DOC housing 104 prior to installing the pair of the catalysts 302 therein. An axis X-X is defined by the hollow and generally cylindrical structure of the DOC housing 104. The DOC housing 104 includes an inlet chamber 202 and an outlet chamber 204. The exhaust gas flow from the inlet passage 108 may be introduced into the inlet chamber 202 of the DOC housing 104. It should be understood that the inlet and outlet chambers 202, 204 form a contiguous passage for the exhaust gas flow to pass therethrough. The views illustrated in FIGS. 2 to 5 are cutaway perspective views merely for the purpose of clarity.

A clamping wall 206 may be provided at one end of the inlet chamber 202 and at one end of the outlet chamber 204 of the DOC housing 104 respectively. The clamping wall 206 is configured to at least partially surround the inlet chamber 202 and the outlet chamber 204 of the DOC housing 104. For example, in the accompanying figures, the clamping wall 206 has a ring shaped structure and completely surrounds the inlet and outlet chambers 202, 204 of the DOC housing 104. The clamping wall 206 may be made from any suitable material.

Further, in one embodiment, a portion 208 of the clamping wall 206 may extend radially outwards towards an exterior surface of the DOC housing 104. Also, a flange 210 may be provided at one end of the extended portion 208 of the clamping wall 206. In the illustrated embodiment, the flange 210 includes a number of holes 212. A number of mechanical fasteners may be received through these holes 212 for attaching the clamping wall 206 to a side wall of the DOC housing 104 of the aftertreatment housing 102. More particularly, a side plate or a service door (not shown) may be affixed onto the flange 210 of the clamping wall 206. This service door is configured to provide easy access to the DOC housing 104.

Figure 3:
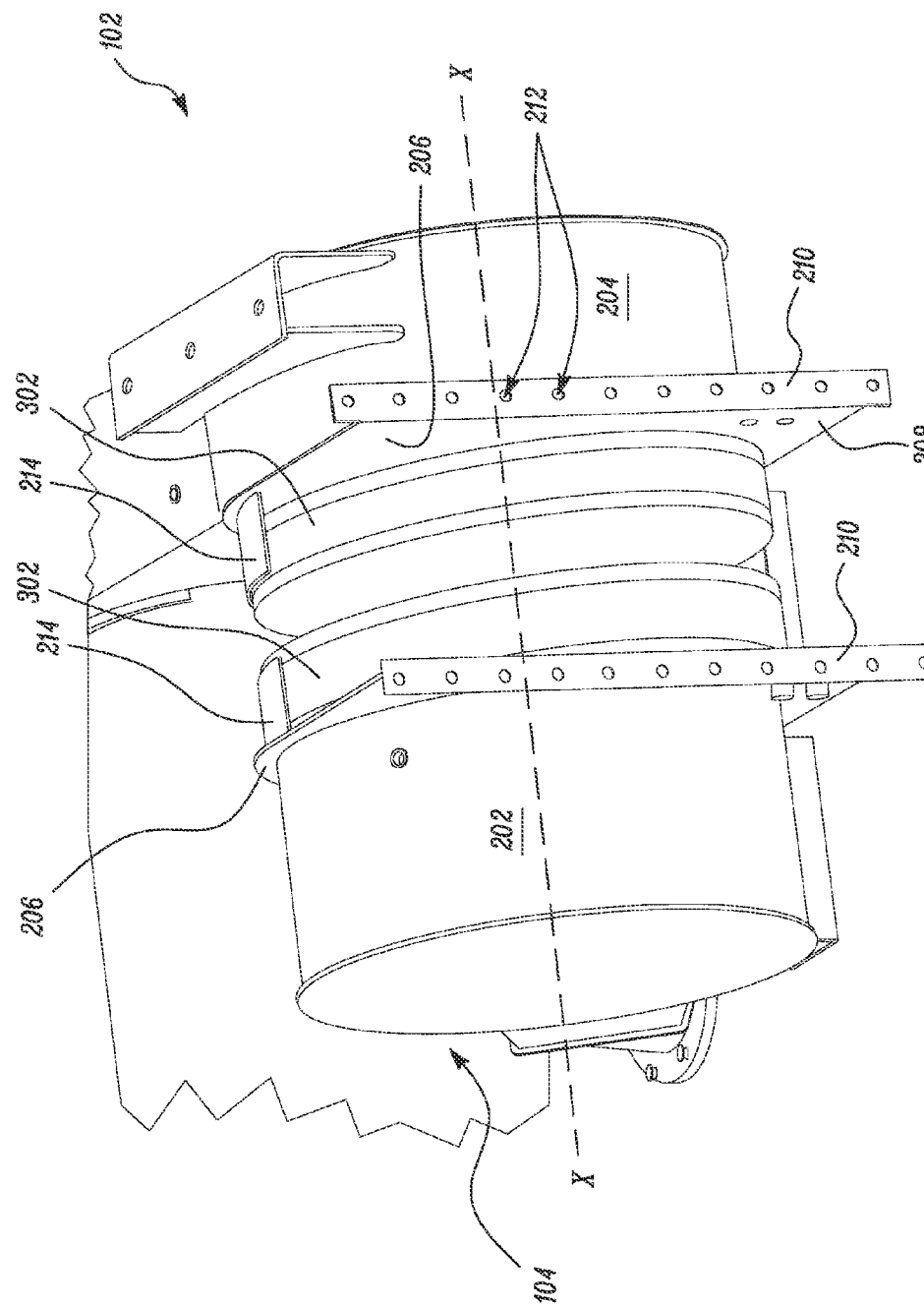
FIG. 3 is a cutaway perspective view of the DOC housing showing a pair of catalysts installed therein.

Additionally, a first support structure 214 is attached to the clamping wall 206. The first support structure 214 extends from the clamping wall 206 in an axial direction and surrounds at least a portion of the clamping wall 206. In the illustrated embodiment, the first support structure 214 has an arcuate structure. Moreover, the first support structure 214 may be positioned on a far side of the DOC housing 104, with respect to the flange 210 of the clamping wall 206. In one embodiment, the first support structure 214 may be welded onto the clamping wall 206. Alternatively, any other method of attaching the first support structure 214 to the clamping wall 206 may be utilized without deviating from the scope of the present disclosure; in addition, embodiments include configurations wherein the first support structure 214 and the clamping wall 206 may be integrally formed, e.g., via stamping. Referring to FIG. 3, the pair of the catalysts 302 is inserted into the DOC housing arrangement 104 of FIG. 2. The catalyst 302 may include a metallic substrate for reduction of HC and/or CO in the exhaust gas flow. A person of ordinary skill in the art will appreciate that any suitable catalyst known in the art may be utilized without any limitation.

In the illustrated embodiment, the pair of the catalysts 302 is axially spaced apart from each other. The catalysts 302 are disc shaped and are semi permeable such that the exhaust gas flow received through the inlet chamber 202 of the DOC housing 104 may pass through the catalysts 302 and further into the outlet chamber 204 of the DOC housing 104. It should be noted that the positioning of the catalysts 302 within the DOC housing 104 shown in the accompanying figures is merely on an illustrative basis and does not limit the scope of the present disclosure. Moreover, the aftertreatment housing 102 may include additional number of catalysts based on the application.

The catalysts 302 may be installed or inserted into the DOC housing 104 in such manner that the catalyst 302 may contact with the first support structure 214 and a portion of the clamping wall 206. In one embodiment, a thickness of the catalyst 302 may be generally greater than a width of the first support structure 214, such that at least a portion of the catalyst 302 extends axially from the first support structure 214.

Figure 4:
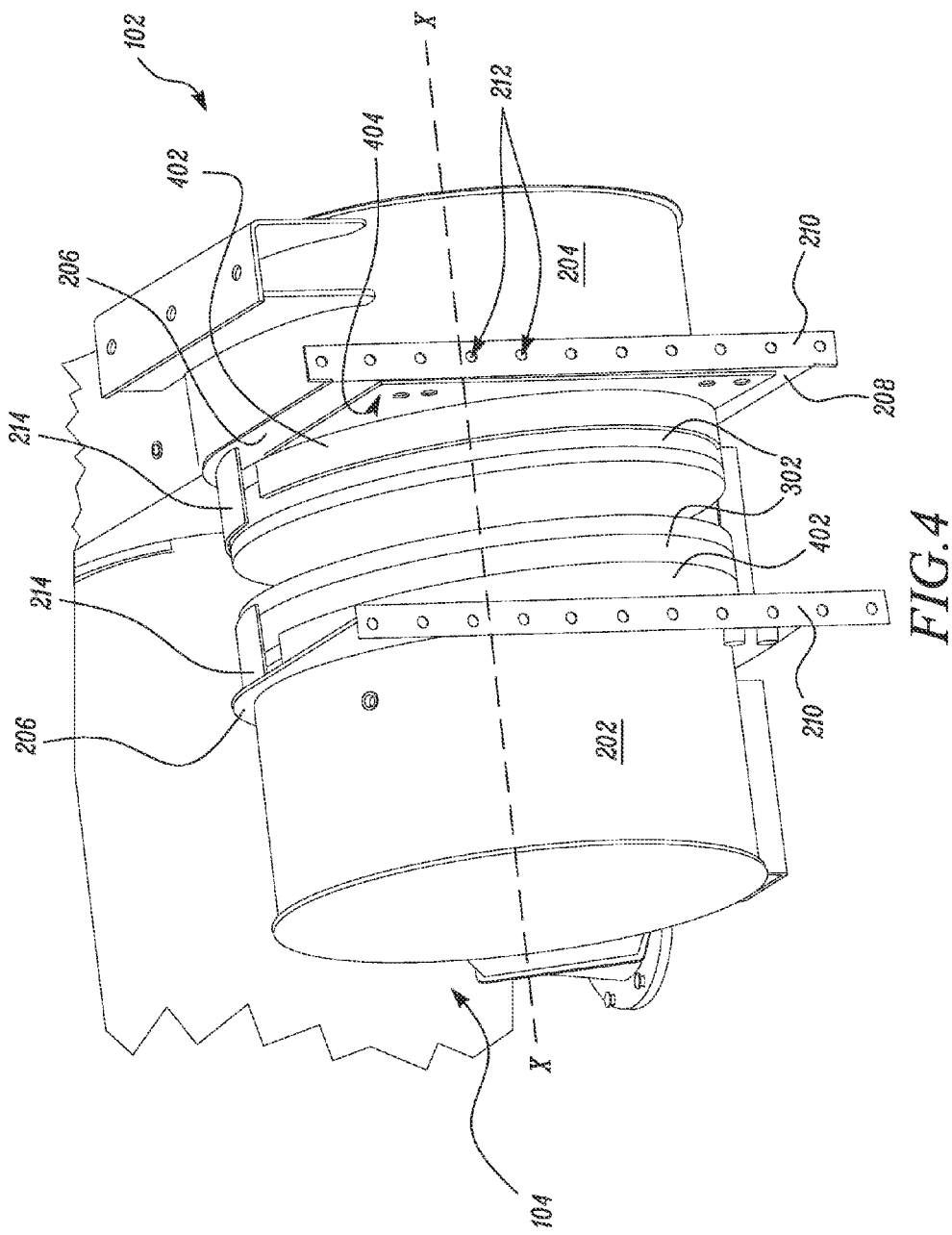
FIG. 4 is a cutaway perspective view of the DOC housing including a support structure in contact with the pair of catalysts.

As shown in FIG. 4, after inserting the catalyst 302 into the DOC housing 104, a second support structure 402 may be provided. The second support structure 402 may be attached to a portion of the clamping wall 206. In one embodiment, a clamp attachment surface 404 may extend radially outwards from the second support structure 402. The clamp attachment surface 404 may have a planar configuration. The clamp attachment surface 404 is configured to be affixed to the clamping wall 206 using any known means. In one embodiment, the clamp attachment surface 404 may be affixed to the clamping wall 206 using mechanical fasteners such as bolts, screws, and so on. A person of ordinary skill in the art will appreciate that the shape of the first and second support structures 214, 402 may be such that a combination of the first and second support structures 214, 402 and the clamping wall 206 and the clamp attachment surface 404 are configured to surround and support the catalyst 302 in order to prevent a radial movement of the catalyst 302 within the DOC housing 104.

Figure 5:
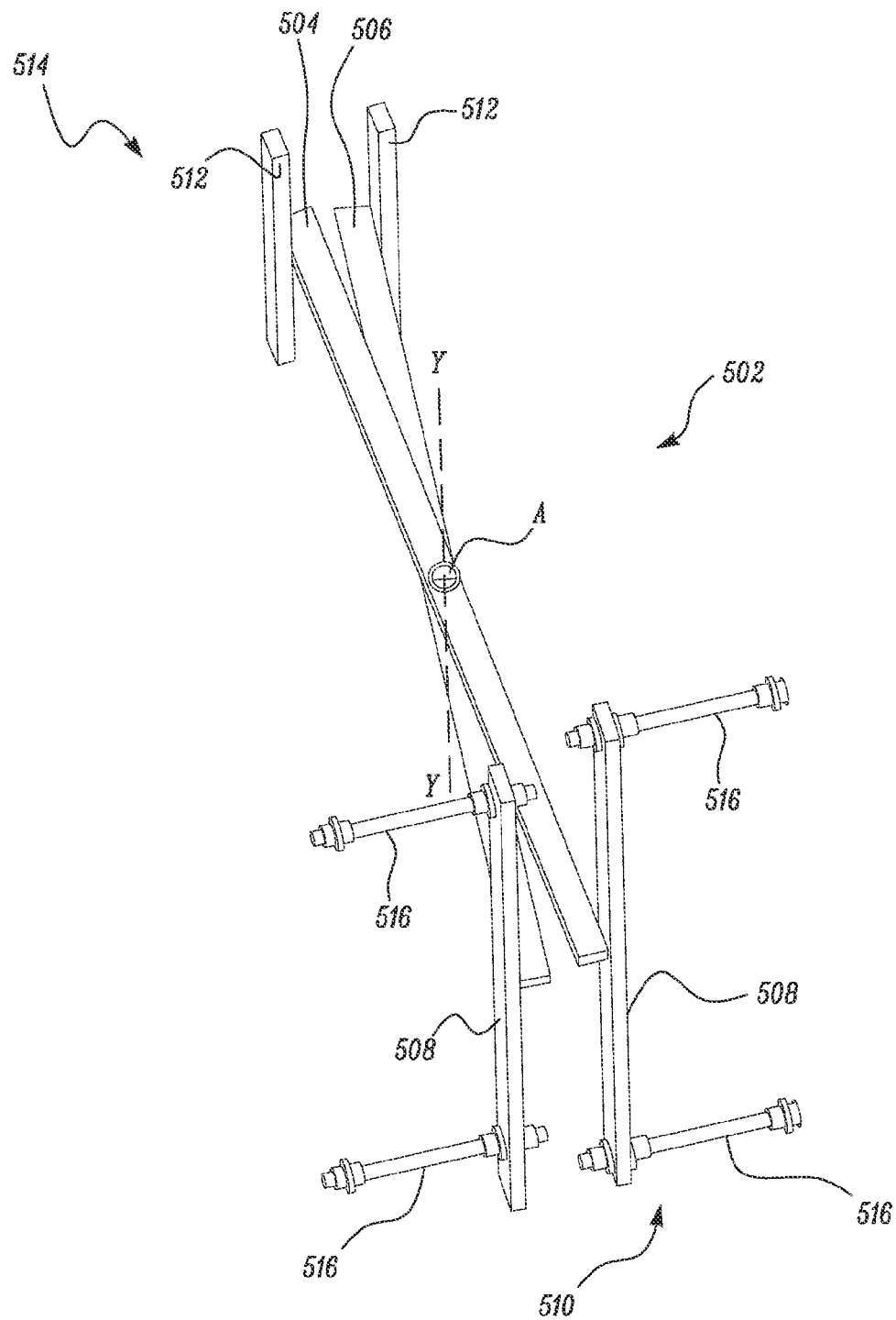
FIG. 5 is a cutaway perspective view of the DOC housing with an exemplary embodiment of a spreader bar assembly positioned between the pair of catalysts.
Figure 6:
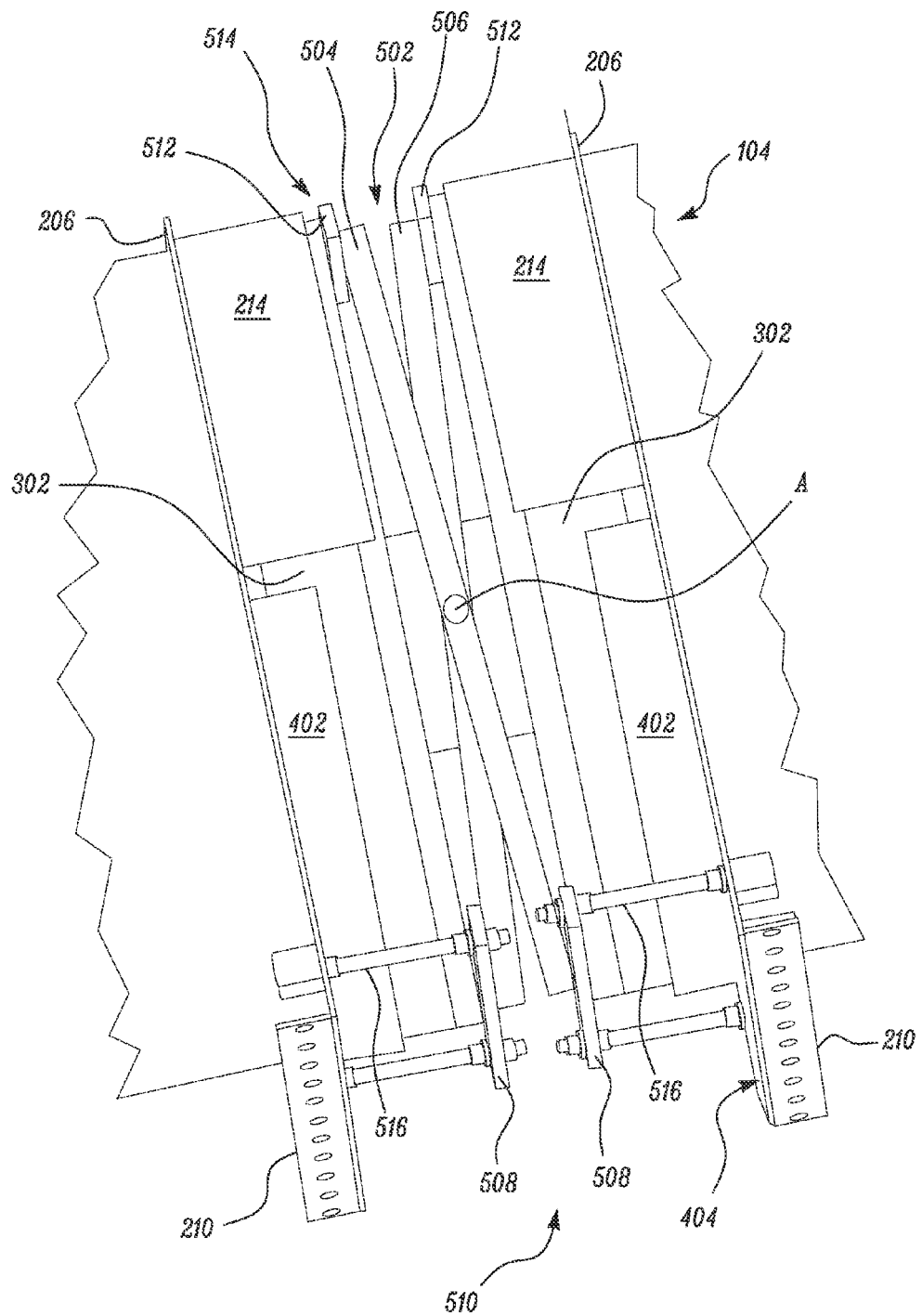
FIG. 6 is a perspective view of the exemplary embodiment of the spreader bar assembly.

As illustrated in FIGS. 5 and 6, the retention mechanism embodied as a spreader bar assembly 502 is positioned between the pair of the catalysts 302. The spreader bar assembly 502 is configured to seal each of the catalysts 302 against the inlet chamber 202 and the outlet chamber 204 of the DOC housing 104 respectively. More particularly, the spreader bar assembly 502 is configured to prevent a movement of the pair of catalysts 302 in an axial direction.

FIG. 5 is a perspective view of the spreader bar assembly 502, according to one embodiment of the present disclosure. The spreader bar assembly 502 includes a pair of arms, namely a first arm 504 and a second arm 506. The first and second arms 504, 506 of the spreader bar assembly 502 are disposed in a scissor type arrangement such that an axis of rotation Y-Y is defined about a pivot point A. Each of the first and second arms 504, 506 may have a rod like structure.

A first contact member 508 is attached at a near side or a first side 510 and a second contact member 512 is attached at a far side or a second side 514 of the spreader bar assembly 502. The first and second side 510, 514 of the spreader bar assembly 502 may be decided based on proximity to the service door, such that the first side 510 of the spreader bar assembly 502 is relatively closer to the service door, whereas the second side 514 is farther away from the service door.

More particularly, the first and second contact members 508, 512 may be attached to both ends of the first and second arms 504, 506. The first and second contact members 508, 512 may extend in a direction substantially perpendicular to the axis X-X of the DOC housing 104. Referring to FIG. 5, the first and second contact members 508, 512, when installed, are configured to contact with the catalysts 302.

The shape, size and design of the first and second contact members 508, 512 may vary based on the application. In one embodiment, as shown in FIGS. 5 and 6, the first and second contact members 508, 512 may have a planar configuration, such that the first and second contact members 508, 512 are shaped as fingers or bars. The first contact member 508 provided on the first side 510 of the first and second arms 504, 506 may have a generally longer length or a larger contact area for contacting with the catalyst 302 as compared to that of the second contact member 512 on the second side 514 of the first and second arms 504, 506. A person of ordinary skill in the art will appreciate that design and positioning of the first and second contact members 508, 512 may be so chosen such that on installation, the first and second contact members 508, 512 may provide minimum obstruction in the flow of the exhaust gas through the catalysts 302. The spreader bar assembly 502 including the first and second arms 504, 506 and the first and second contact members 508, 512 may be made from any suitable metal or polymer.

The spreader bar assembly 502 further includes a sealing member 516 provided in association with the first contact members 508. The sealing member 516 is provided on the first side 510 of the spreader bar assembly 502 for attaching the spreader bar assembly 502 to the clamping wall 206 and thereby holding the catalysts 302 in place with respect to the DOC housing 104. In one embodiment, the sealing member 516 may include mechanical fasteners such as for example, a threaded rod and nut assembly. The threaded rod and nut assembly may be provided on either ends of the first contact members 508 provided on the first side 510 of the spreader bar assembly 502. The threaded rod and nut assembly may be used to engage the spreader bar assembly 502 with the clamping wall 206. Any other fastening or attaching means known in the art may be used to attach the first contact members 508 to the clamping wall 206.

When the sealing member 516 is tightened or torqued for affixing the spreader bar assembly 502 to the clamping wall 206, a force may be exerted on the first side 510 of the spreader bar assembly 502. This force may be exerted in the axial direction, such that the force causes the first contact members 508 on the first side 510 of the first and second arms 504, 506 to be pushed against the respective inlet and outlet chambers 202, 204, thereby spreading or separating the first and second arms 504, 506 of the scissor arrangement from each other about the pivot point A of the spreader bar assembly 502. As the first and second arms 504, 506 of the spreader bar assembly 502 are separated at the first side 510, the scissor type arrangement causes rotation of the first and second arms 504, 506 about the pivot pint A along the axis Y-Y, causing an opposing force to be generated on a second side 514 of the spreader bar assembly 502. The second contact members 512 on the second side 514 of the spreader bar assembly 502 may be pushed against the catalyst 302 due to the opposing force. This may result in the catalysts 302 being sealed against the inlet and outlet chambers 202, 204 of the DOC housing 104 respectively. An extent of the sealing of the catalysts 302 within the DOC housing 104 provided by the spreader bar assembly 502 may be based on the force applied at the first side 510 of the spreader bar assembly 502.

INDUSTRIAL APPLICABILITY

The spreader bar assembly 502 disclosed herein allows for easy installation within the DOC housing 104 thereby providing easy access to the catalysts 302 for the purpose of servicing. Ease of access leads to a reduction in service downtime of the catalysts 302. As described earlier, an operator exerts force on the first side 510 of the spreader bar assembly 502 that may be accessed easily from the service door provided on the housing of the aftertreatment housing 102. Due to the scissor type arrangement of the spreader bar assembly 502, the opposing force is generated at the second side 514 of the spreader bar assembly 502 that is otherwise relatively difficult to access. This allows for the sealing of the catalysts 302 within the DOC housing 104 with ease. The design of the spreader bar assembly 502 is such that the spreader bar assembly 502 may be utilized in association with catalysts 302 having different dimensions. A person of ordinary skill in the art will appreciate that the given spreader bar assembly 502 may be used in a variety of aftertreatment applications.

Figure 7:
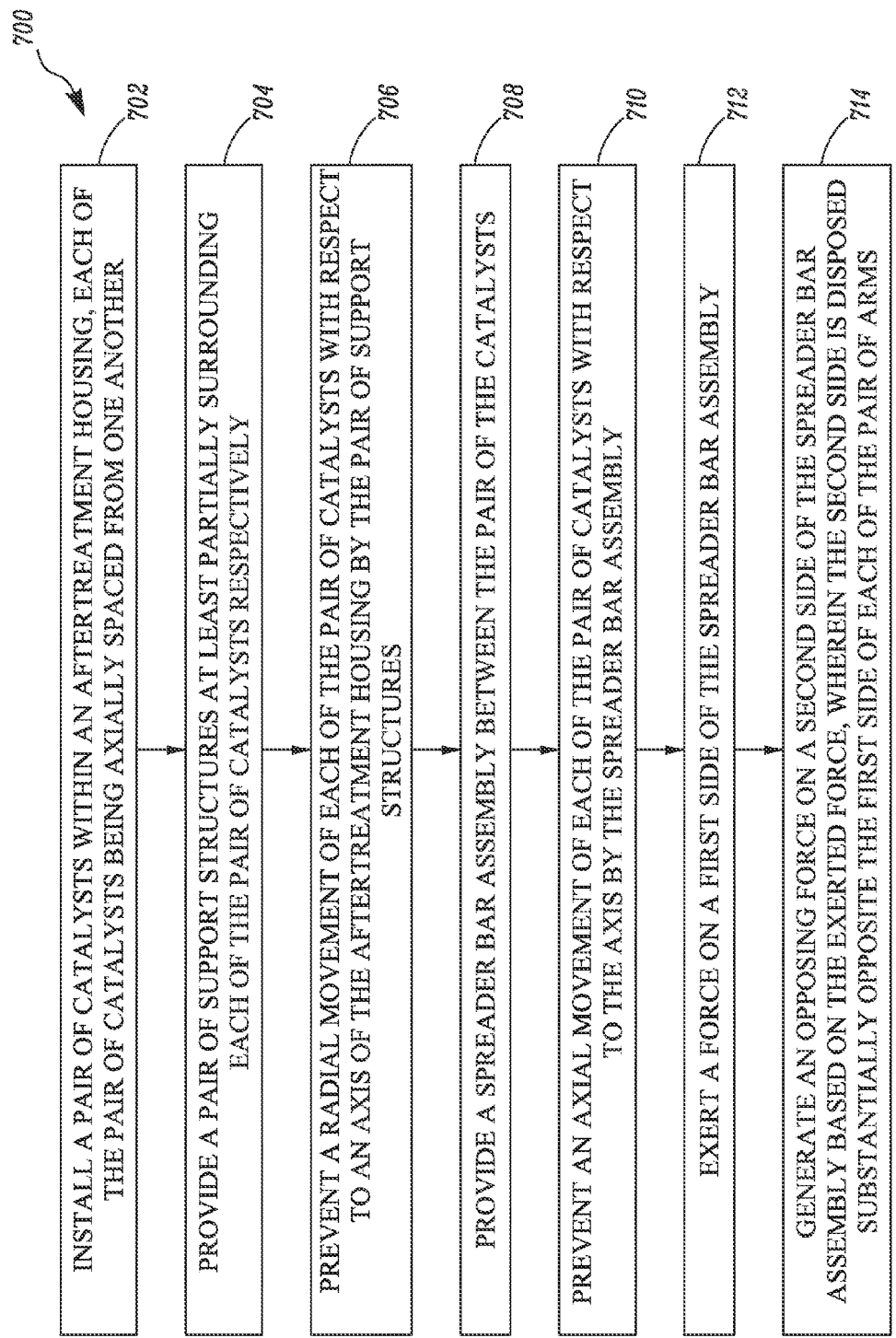
FIG. 7 is a flowchart for a method of supporting the pair of catalysts within the aftertreatment housing.

FIG. 7 is a flowchart of a method 700 for supporting the catalysts 302 within the DOC housing 104. The clamping wall 206 is attached to the inlet and outlet chambers 202, 204 of the DOC housing 104. The first support structures 214 are affixed to the clamping wall 206. In one embodiment, the first support structures 214 may be welded onto the clamping walls 206. At step 702, the catalysts 302 are installed within the DOC housing 104.

At step 704, the second support structures 402 are affixed to the clamping wall 206. At step 706, the combination of the first and second support structures 214, 402 prevents the radial movement of the catalysts 302 within the DOC housing 104 with respect to the axis X-X.

At step 708, the spreader bar assembly 502 is provided between the catalysts 302. At step 710, the axial movement of the catalysts 302 is prevented with respect to the axis X-X by the spreader bar assembly 502.

At step 712, the force is exerted on the first side 510 of the spreader bar assembly 502. For example, as described earlier, this force is exerted by the torqueing or tightening of the mechanical fasteners provided at the first side 510 of the spreader bar assembly 502. At step 714, the opposing force is generated on the second side 514 of the spreader bar assembly 502 based on the force exerted on the first side 510 of the spreader bar assembly 502. These forces exerted and generated at the first and second sides 510, 514 of the spreader bar assembly 502 are configured to seal the catalysts 302 with respect to the inlet and outlet chambers 202, 204 of the DOC housing 104 respectively.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. An aftertreatment housing comprising:
    an inlet chamber;
    an outlet chamber;
    a pair of catalysts disposed between the inlet chamber and the outlet chamber; and
    a spreader bar assembly disposed between the pair of catalysts, the spreader bar assembly comprising:
        a pair of arms disposed in a scissor type arrangement defining an axis of rotation therebetween;
        a contact member attached to an end of each of the pair of arms, the contact member configured to maintain a contact with the pair of catalysts; and
        a sealing member provided in association with the contact member and disposed on a first side of each of the pair of arms, wherein on exerting a force on the sealing member on the first side of each of the pair of arms, an opposing force is generated on a second side of each of the pair of arms disposed substantially opposite the first side of each of the pair of arms.

2. The aftertreatment housing of claim 1 further comprising:
    a clamping wall configured to surround at least a portion of the inlet chamber and the outlet chamber.

3. The aftertreatment housing of claim 2, wherein a portion of the clamping wall extends radially outwards with respect to the axis.

4. The aftertreatment housing of claim 2 further comprising:
    a support structure attached to the clamping wall, the support structure configured to at least partially surround the catalyst.

5. The aftertreatment housing of claim 4 further comprising:
    a clamp attachment surface extending radially from the support structure.

6. The aftertreatment housing of claim 5, wherein the clamp attachment surface is configured to attach to the clamping wall using mechanical fasteners.

7. The aftertreatment housing of claim 2, wherein the sealing member includes mechanical fasteners configured to engage with the clamping wall.

8. The aftertreatment housing of claim 7, wherein the mechanical fastener is provided on either end of the contact member.

9. The aftertreatment housing of claim 8, wherein the mechanical fastener includes a threaded rod and nut assembly.

* * * * *